United States Patent
Obana

(10) Patent No.: US 8,483,386 B2
(45) Date of Patent: Jul. 9, 2013

(54) SHARE GENERATION APPARATUS, RECONSTRUCTION APPARATUS, VERIFICATION APPARATUS, AND SECRET SHARING SYSTEM

(75) Inventor: Satoshi Obana, Minato-ku (JP)

(73) Assignee: NEC Corporation, Tokyo (JP)

( * ) Notice: Subject to any disclaimer, the term of this patent is extended or adjusted under 35 U.S.C. 154(b) by 401 days.

(21) Appl. No.: 12/747,400

(22) PCT Filed: Dec. 12, 2008

(86) PCT No.: PCT/JP2008/072642
§ 371 (c)(1),
(2), (4) Date: Jun. 10, 2010

(87) PCT Pub. No.: WO2009/075353
PCT Pub. Date: Jun. 18, 2009

(65) Prior Publication Data
US 2010/0260334 A1    Oct. 14, 2010

(30) Foreign Application Priority Data
Dec. 12, 2007    (JP) .................................. 2007-320830

(51) Int. Cl.
G06F 21/00    (2006.01)
(52) U.S. Cl.
USPC ...... 380/28; 726/2; 726/25; 726/30; 713/150; 713/171; 713/189; 709/203; 380/259; 705/75; 455/452.1
(58) Field of Classification Search
USPC .................................................... 380/28, 44
See application file for complete search history.

(56) References Cited

U.S. PATENT DOCUMENTS

| | | | | |
|---|---|---|---|---|
| 6,195,751 | B1 * | 2/2001 | Caronni et al. | 713/163 |
| 6,813,357 | B1 * | 11/2004 | Matsuzaki et al. | 380/279 |
| 7,958,354 | B1 * | 6/2011 | Davis | 713/170 |
| 2003/0048906 | A1 * | 3/2003 | Vora et al. | 380/277 |
| 2004/0179686 | A1 * | 9/2004 | Matsumura et al. | 380/44 |
| 2005/0050322 | A1 * | 3/2005 | Mizrah | 713/168 |
| 2005/0147250 | A1 * | 7/2005 | Tang | 380/259 |
| 2007/0168556 | A1 | 7/2007 | Tanimoto et al. | |
| 2010/0217978 | A1 * | 8/2010 | Schneider | 713/168 |

FOREIGN PATENT DOCUMENTS

| | | | |
|---|---|---|---|
| JP | 2007-124032 A | 5/2007 | |
| JP | 2007-135170 A | 5/2007 | |

OTHER PUBLICATIONS

Cramer et al., "On the Complexity of Verifiable Secret Sharing and Multiparty Computation", Proceedings of the thirty-second annual ACM, STOC, 2000.*

(Continued)

*Primary Examiner* — Morshed Mehedi
(74) *Attorney, Agent, or Firm* — Sughrue Mion, PLLC

(57) ABSTRACT

A share generation apparatus (100) generates check data corresponding to a secret and random number, shares and encodes the secret and random number in accordance with a predetermined access structure, and stores them in storage devices (300_1 to 300_n). A reconstruction apparatus (200) reads out the shared/encoded secret and random number from the storage devices corresponding to members of the access structure, and reconstructs them. If the check data correspond to the reconstructed secret and random number, it is determined that the reconstructed secret is correct. If not, it is determined that cheating has occurred. Cheating of forging some shares by referring to (n−1) shares can be detected regardless of a distribution used to select a secret.

18 Claims, 5 Drawing Sheets

OTHER PUBLICATIONS

T. Araki, et al., "Efficient Secret Sharing Schemes Secure against Cheating based on Universal Hash Family," SCIS The 2007 Symposium on Cryptography and Information Security, Jan. 23-26, 2007, pp. 1-6.

S. Cabello, et al., "Secret Sharing Schemes with Detection of Cheaters for a General Access Structure," Lecture Notes in Computer Science, Fundamentals of Computation Theory, Oct. 13, 1999, pp. 185-194, vol. 1684.

S. Obana, "A Generic Construction of Secret Sharing Schemes Secure against $n$-1 Cheaters," SCIS The 2008 Symposium on Cryptography and Information Security, Jan. 22-25, 2008, pp. 1-6.

S. Obana, "Almost Optimum $t$-Cheater Identifiable Secret Sharing Schemes," SCIS 2007, The 2007 Symposium on Cryptography and Information Security, Jan. 23-26, 2007, pp. 1-6.

T. Araki, Efficient $(k,n)$ Threshold Secret Sharing Schemes Secure Against Cheating from $n$-1 Cheaters, ACISP 2007, pp. 133-142, LNCS 4586.

J. Benaloh, et al., "Generalized Secret Sharing and Monotone Functions," Advances in Cryptology, CRYPTO 88, 1990, pp. 27-35, LNCS 403.

A. Shamir, "How to Share a Secret," Comm. ACM, 1979, pp. 612-613, vol. 22, No. 11.

W. Ogata, et al., "Optimum Secret Sharing Scheme Secure Against Cheating," 2006 Society for Industrial and Applied Mathematics, 2006, pp. 79-95, vol. 20, No. 1.

S. Obana, et al., "Almost Optimum Secret Sharing Schemes Secure Against Cheating for Arbitrary Secret Distribution," ASIACRYPT 2006, 2006, pp. 364-379, LNCS 4284.

M. Tompa, et al., "How to Share a Secret with Cheaters," J. Cryptology, 1988, pp. 133-138.

* cited by examiner

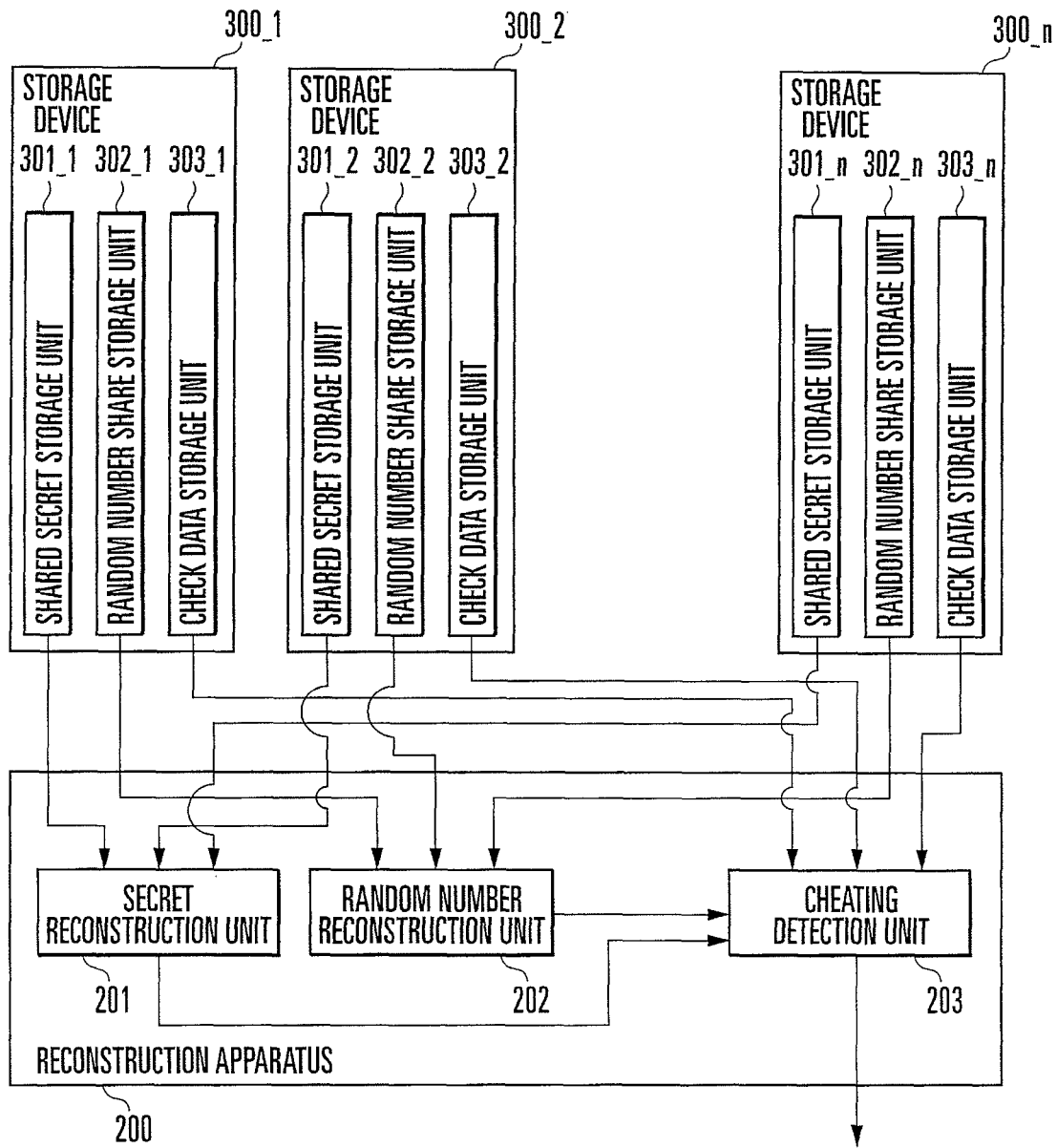
F I G. 2

SHARE GENERATION APPARATUS, RECONSTRUCTION APPARATUS, VERIFICATION APPARATUS, AND SECRET SHARING SYSTEM

TECHNICAL FIELD

The present invention relates to a share generation apparatus, reconstruction apparatus, verification apparatus, and secret sharing system for sharing a secret and securely saving it.

BACKGROUND ART

A saved secret (e.g., a private key used in cryptography) is under a threat of loss and corruption and a threat of theft. Copying a secret is effective against the former threat. However, copying raises the latter threat of theft. One information security technique for solving this problem is a secret sharing scheme.

The secret sharing scheme divides a secret into a plurality of shares. The secret sharing scheme has a feature: If predetermined shares are collected, the secret can be uniquely reconstructed, but if other shares are collected, no information on the secret is leaked. In this specification, letting n be the number of shares, the respective shares are identified by 1 to n. In the secret sharing scheme, a set of shares capable of reconstructing a secret can be defined by a family $\Gamma$ of share sets called an access structure. The access structure $\Gamma$ is a family of sets having, as an element, a set of the identifiers of minimum shares capable of reconstructing a secret. In a secret sharing scheme having the access structure $\Gamma$, that a set w of shares can reconstruct a secret means that V which satisfies $V \in \Gamma$ and $V \subset W$ exists for a share identifier set W corresponding to w. The share identifier set W which meets these properties is defined as an access set of $\Gamma$.

For example, a secret sharing scheme called a (k,n) threshold scheme has features: (1) Information on a secret cannot be obtained from less than k shares out of n shares. (2) The secret is uniquely reconstructed from k or more shares. The access structure $\Gamma$ in the (k,n) threshold scheme is defined by a family of sets in which $\Gamma=[V|V \subset [1, \ldots, n]$ and the number of elements of V is k]. Problems when reconstructing a secret in the secret sharing scheme will be examined.

When reconstructing a secret, shares need to be collected from other participants which hold them. At this time, a participant requested of a share does not always transfer the distributed value to the reconstructor without forgery. Note that "forgery" means not only intentional one but also an unintended modification such as breakdown of a device or a mere error.

Reconstructing a secret with a forged share may result in a value different from the secret. To prevent this, secret sharing schemes require a method capable of detecting at high probability the presence of a forged value in shares used for reconstruction. Depending on the operation form, shares are selected by various means. The forged value detection ratio needs to be high regardless of a probability distribution used to select shares. As techniques for solving these problems, there have been known methods in reference 2 (Martin Tompa, Heather Woll, "How to Share a Secret with Cheaters", Journal of Cryptology, vol. 1, pages 133-138, 1988), reference 3 (Wakaha Ogata, Kaoru Kurosawa, Douglas R. Stinson, "Optimum Secret Sharing Scheme Secure Against Cheating", SIAM Journal on Discrete Mathematics, Vol. 20, No. 1, pages 79-95, 2006), reference 5 (Satoshi Obana and Toshinori Araki, "Almost Optimum Secret Sharing Schemes Secure Against Cheating for Arbitrary Secret Distribution", Advances in Cryptology—Asiacrypt 2006, Lecture Notes in Computer Science 4284, pp. 364-379, 2006), and reference 6 (Toshinori Araki, "Efficient (k,n) Threshold Secret Sharing Schemes Secure Against Cheating from n−1 Cheaters", Proceedings of ACISP 2007, Lecture Notes in Computer Science 4586, pp. 133-142, 2007).

Reference 2 describes a (k,n) threshold scheme capable of detecting, at a probability of $(1-\epsilon)$, cheating of forging (k−1) shares at most by referring to (n−1) shares regardless of a probability distribution used to select a secret. According to a method described in reference 1 (Adi Shamir, "How to Share a Secret", Comm. ACM, 22 (11), 612-613 (1979)), when a secret is regarded as a set of elements s, shares are a set of elements $((s-1)(k-1)/\epsilon+k)^2$.

Reference 3 describes a (k,n) threshold scheme capable of detecting, at a probability of $(1-\epsilon)$, cheating of forging (k−1) shares at most by referring to (k−1) shares on condition that a secret is selected in accordance with a uniform probability distribution. In the method described in reference 3, when a secret is regarded as a set of elements s, shares are a set of elements $(1+(s-1)/8)$. An (n,n) threshold secret sharing scheme is described in reference 4 (J. Benaloh and J. Leichter, "Generalized Secret Sharing and Monotone Functions", in Advances in Cryptology—CRYPTO '88, S. Goldwasser, Ed., Lecture Notes in Computer Science 403, pages 27-35, 1989).

Reference 5 describes a secret sharing scheme capable of detecting, at a probability of $(1-\epsilon)$, cheating of forging (k−1) shares at most by referring to (k−1) shares regardless of a probability distribution used to select a secret. In the method described in reference 5, when a secret is regarded as a set of elements s, shares are a set of elements $s/(\epsilon^2)$.

Reference 6 describes a (k,n) threshold scheme capable of detecting, at a probability of $(1-\epsilon)$, cheating of forging (k−1) shares at most by referring to (n−1) shares regardless of a probability distribution used to select shares. According to the method described in reference 1, when a secret is regarded as a set of elements s, and $s \leq 1/\epsilon$ holds, shares are a set of $s^2/\epsilon$.

DISCLOSURE OF INVENTION

Problems to be Solved by the Invention

Of the foregoing techniques, only references 3 and 6 describe techniques secure against cheating of forging (k−1) shares at most by referring to (n−1) shares regardless of the probability at which a secret is selected. However, references 3 and 6 propose only (k,n) threshold schemes, and do not mention a secret sharing scheme, other than a threshold scheme, which is secure against cheating of forging one or a plurality of shares by referring to (n−1) shares.

The present invention has been made in consideration of the above situation, and has as its object to be able to apply, to an arbitrary secret sharing scheme, a secret sharing scheme which can detect cheating regardless of a distribution selected for a secret, and is secure against cheating of forging one or a plurality of shares by referring to (n−1) shares out of n shares.

It is another object of the present invention to decrease the size of shares in a (k,n) threshold scheme secure against cheating of forging one or a plurality of shares by referring to (n−1) shares.

Means of Solution to the Problems

To achieve the above problems, a share generation apparatus according to the present invention comprises secret sharing means for sharing and encoding a secret in accordance with an access structure of a secret sharing scheme, random number sharing means for sharing and encoding a random number in accordance with the access structure of the secret sharing scheme, and check data generation means for generating check data corresponding to the secret and the random number.

A reconstruction apparatus according to the present invention comprises secret reconstruction means for reading out a shared/encoded secret from storage means corresponding to an access structure of a secret sharing scheme, and reconstructing the secret in accordance with the access structure, random number reconstruction means for reading out a shared/encoded random number from the storage means corresponding to the access structure of the secret sharing scheme, and reconstructing the random number in accordance with the access structure, and cheating detection means for reading out check data generated in correspondence with the secret and the random number from all the storage means corresponding to the access structure of the secret sharing scheme, when all the readout check data correspond to the secret reconstructed by the secret reconstruction means and the random number reconstructed by the random number reconstruction means, outputting the reconstructed secret, and when not all the readout check data correspond to the secret reconstructed by the secret reconstruction means and the random number reconstructed by the random number reconstruction means, outputting a signal representing cheating.

A verification apparatus according to the present invention acquires a secret, a random number, and check data generated in correspondence with the secret and the random number, when the check data correspond to the secret and the random number, outputs a signal representing that no forgery of the secret has been verified, and when the check data do not correspond to the secret and the random number, outputs a signal representing cheating.

A secret sharing system according to the present invention comprises a share generation apparatus, storage devices, and a reconstruction apparatus. The share generation apparatus includes secret sharing means for sharing and encoding a secret in accordance with an access structure of a secret sharing scheme, random number sharing means for sharing and encoding a random number in accordance with the access structure of the secret sharing scheme, and check data generation means for generating check data corresponding to the secret and the random number. The storage devices store the shared/encoded secret, the shared/encoded random number, and the check data. The reconstruction apparatus includes secret reconstruction means for reading out the shared/encoded secret from the storage devices corresponding to the access structure, and reconstructing the secret in accordance with the access structure, random number reconstruction means for reading out the shared/encoded random number from the storage devices corresponding to the access structure, and reconstructing the random number in accordance with the access structure, and cheating detection means for reading out the check data from all the storage devices corresponding to the access structure, when all the readout check data correspond to the secret reconstructed by the secret reconstruction means and the random number reconstructed by the random number reconstruction means, outputting the reconstructed secret, and when not all the readout check data correspond to the secret reconstructed by the secret reconstruction means and the random number reconstructed by the random number reconstruction means, outputting a signal representing cheating.

Effects of the Invention

According to the present invention, cheating of forging some shares can be detected by referring to (n−1) shares regardless of a distribution used to select a secret. The present invention is applicable to an arbitrary secret sharing scheme.

Cheating can be detected by determining whether reconstructed check data correspond to a reconstructed secret. The data size of shares can be decreased by using a data set having a small number of elements as check data.

Check data can be selected uniformly at random. Even when (n−1) shares are referred to, high cheating detection ratio can be guaranteed regardless of a distribution used to select a secret.

Further, check data and the forgery check method in the present invention are independent of an applied secret sharing scheme. The present invention is applicable to an arbitrary secret sharing scheme.

BRIEF DESCRIPTION OF DRAWINGS

FIG. 2 is a block diagram of the arrangement of a reconstruction apparatus according to the first exemplary embodiment of the present invention;

BEST MODE FOR CARRYING OUT THE INVENTION

Preferred exemplary embodiments of the present invention will now be described in detail with reference to the accompanying drawings. The following exemplary embodiments are preferred ones of the present invention and impose technically preferable limitations. However, the scope of the present invention is not limited to the following aspects, unless otherwise specified.

First, terms used in this specification will be explained in brief.

Access Structure, Access Set: An access structure is a family of sets having, as an element, a minimum set of shares capable of reconstructing a secret in a secret sharing scheme. A set W where V which satisfies V∈Γ and V ⊂ W exists for the access structure Γ is defined as an access set of Γ. A secret can be reconstructed by collecting the shares of a secret corresponding to the access set W.

Secret Data Set S: It is a set of secrets s to be saved.

Random Number Data Set R: It is a set of shared random numbers r.

Shared Secret Data Sets $VS\_1, VS\_2, \ldots, VS\_n$: They are sets of data (shares) obtained by sharing and encoding a secret s∈S. $VS\_i$ is the ith set of shares.

Random Number Share Data Sets VR_1, VR_2, ..., VR_n: They are sets of data (shares) obtained by sharing and encoding a random number r∈R. VR_i is the ith set of shares.

Check Data Set E: It is a set of check data generated in correspondence with the secret s∈S and the random number r∈R.

Operators: In this specifications, signs "+", "−", "*", and "^" are used as addition, subtraction, multiplication, and power operators.

When saving a secret, a secret sharing system according to the exemplary embodiment of the present invention generates check data corresponding to the secret and random number. The secret sharing system shares and encodes the secret and random number in accordance with a predetermined access structure, and stores them in storage devices.

When reconstructing a secret, the secret sharing system reads out a shared/encoded secret and shared/encoded random number from a plurality of storage devices corresponding to members of the access structure. The secret sharing system reconstructs the secret and random number.

The secret sharing system determines whether check data correspond to the reconstructed secret and random number. If so, the secret sharing system determines that the reconstructed secret is correct; otherwise, the secret sharing system determines that cheating has occurred (reconstructed secret has been forged).

Figure 1:
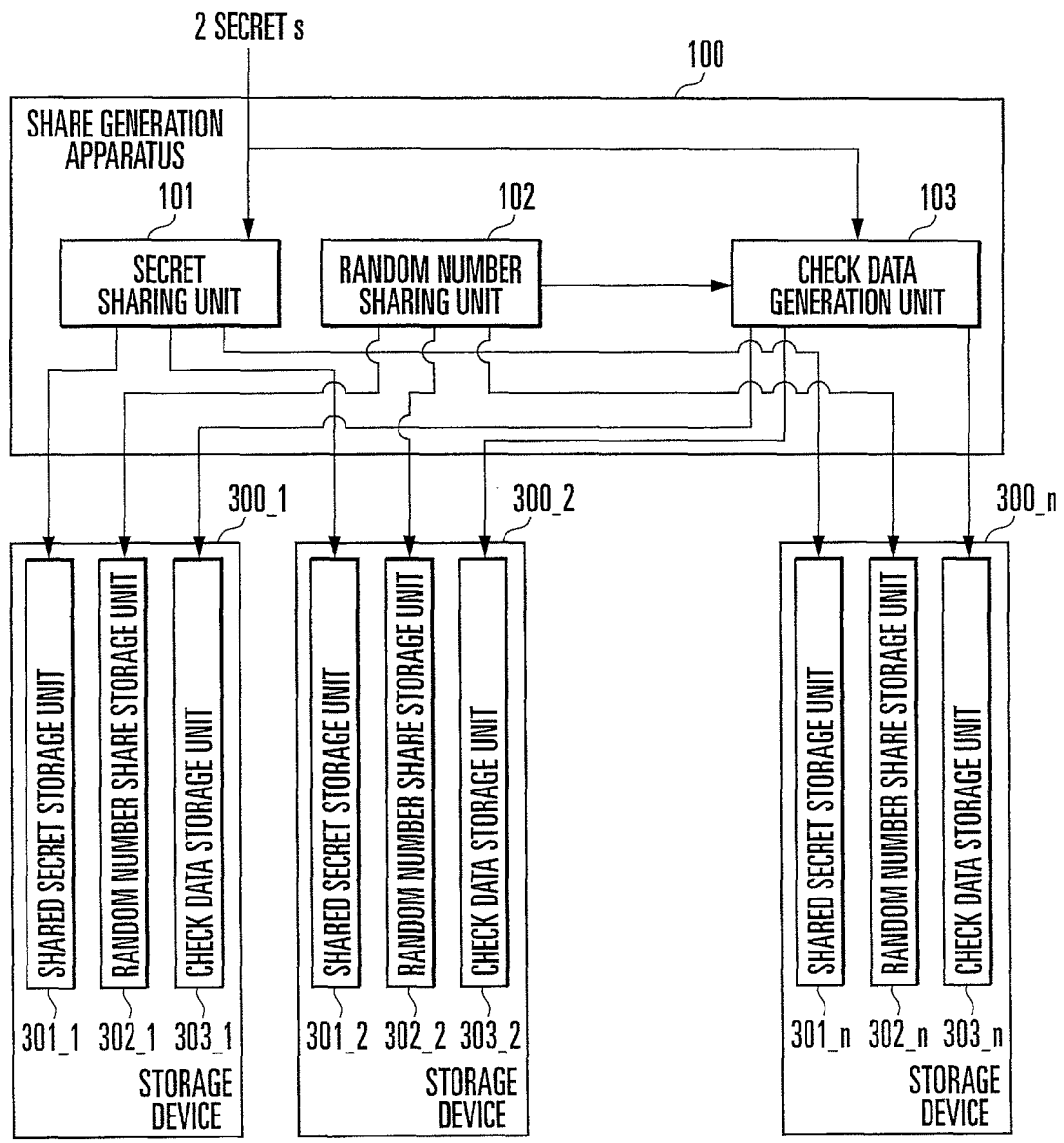
FIG. 1 is a block diagram of the arrangement of a share generation apparatus according to the first exemplary embodiment of the present invention.

A secret sharing system according to the first exemplary embodiment of the present invention includes a share generation apparatus 100, a reconstruction apparatus 200, and a plurality of storage devices 300_1 to 300_n, as shown in FIG. 1.

The storage devices 300_1 to 300_n include shared secret storage units 301_1 to 301_n which store the members of the shared secret data sets VS_1 to VS_n, random number share storage units 302_1 to 302_n which store the members of the random number share data sets VR_1 to VR_n, and check data storage units 303_1 to 303_n which store the members of the check data set E.

The arrangement of the share generation apparatus 100 will be explained with reference to FIG. 1. FIG. 1 is a block diagram of the arrangement of the share generation apparatus 100. As shown in FIG. 1, the share generation apparatus 100 includes a secret sharing unit 101, random number sharing unit 102, and check data generation unit 103.

The secret sharing unit 101 receives a secret s(2), and outputs n data (secret shares) vs_1, vs_2, ..., vs_n (vs_i∈VS) obtained by sharing and encoding the secret s(2) in accordance with a predetermined access structure Γ.

The random number sharing unit 102 internally generates the random number r∈R, and outputs the generated random number r and n data (random number shares) vr_1, vr_2, ..., vr_n obtained by sharing and encoding the random number r in accordance with the access structure Γ.

The check data generation unit 103 receives the secret s=(s_1, s_2, ..., s_N) and the random number r=(r_1, r_2, ..., r_[k−1])∈R output from the random number sharing unit 102. The check data generation unit 103 generates and outputs check data e_1, e_2, ..., e_n (where e_i=(e_[i0], e_[i1])∈E) independently for n shares.

In the exemplary embodiment, each check data (e_[i0], e_[i1])∈E is data which satisfies for a predetermined constant c:

$$e\_[i0]+s\_1*e\_[i1]+s\_2*e\_[i1]^2+\ldots+\\s\_N*e\_[i1]^N+r\_1*e\_[i1]^{[N+1]}+\\r\_2*e\_[i1]^{[N+2]}+\ldots+r\_[k-1]*e\_[i1]^{[N+k-1]}=c$$

where k is the number of elements of a set where the number of elements is maximum among the members of the access structures Γ.

The share generation apparatus 100 receives the secret s serving as a member (element) of the secret data set S. The shared secret storage units 301_1 to 301_n in the storage devices 300_1 to 300_n store the members vs_1 to vs_n of VS output from the secret sharing unit. The random number share storage units 302_1 to 302_n store the members vr_1 to vr_n of the random number share VR output from the random number sharing unit 102. The check data storage units 303_1 to 303_n store check data e_1 to e_n serving as members of the check data set E.

The arrangement of the reconstruction apparatus 200 will be described with reference to FIG. 2. FIG. 2 is a block diagram of the arrangement of the reconstruction apparatus 200. As shown in FIG. 2, the reconstruction apparatus 200 includes a secret reconstruction unit 201, random number reconstruction unit 202, and cheating detection unit 203.

The secret reconstruction unit 201 reads out data stored in the shared secret storage units 301 of the storage devices 300 corresponding to an arbitrary access set W of a predetermined access structure Γ. Then, the secret reconstruction unit 201 outputs reconstructed secret data s∈S.

For the access structure Γ and access set W, the random number reconstruction unit 202 reads out data stored in the random number share storage units 302 of the storage devices 300 corresponding to W. Then, the random number reconstruction unit 202 outputs the reconstructed random number r∈R.

The cheating detection unit 203 reads out the secret data s=(s_1, s_2, ..., s_N)∈S reconstructed by the secret reconstruction unit 201, the random number r=(r_1, r_2, ..., r_[k−1])∈R reconstructed by the random number reconstruction unit 202, and check data stored in the check data storage units 303 of the storage devices 300 corresponding to W. For all the readout check data e_i=(e_[i0], e_[i1])∈E, the cheating detection unit 203 determines whether $$e\_[i0]+s\_1*e\_[i1]+s\_2*e\_[i1]^2+\ldots+\\s\_N*e\_[i1]^N+r\_1*e\_[i1]^{[N+1]}+\\r\_2*e\_[i1]^{[N+2]}+\ldots+r\_[k-1]*e\_[i1]^{[N+k-1]}=c$$

is established. If so, the cheating detection unit 203 outputs the reconstructed secret s∈S; otherwise, outputs a symbol representing that cheating has been detected.

The share generation apparatus 100 and reconstruction apparatus 200 shown in FIGS. 1 and 2 are implemented by a semiconductor integrated circuit such as an LSI (Large Scale Integration) or DSP (Digital Signal Processor) formed from a logical circuit and the like.

Figure 4:
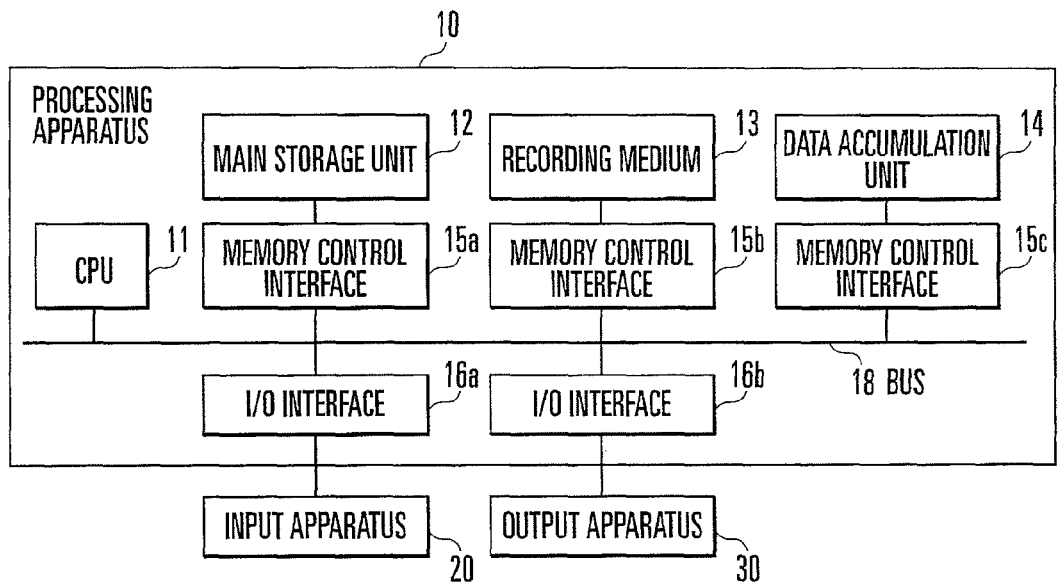
FIG. 4 is a block diagram of the arrangement of a processing apparatus which executes processes that are performed by the share generation apparatus and reconstruction apparatus according to the first exemplary embodiment of the present invention.

As shown in FIG. 4, the share generation apparatus 100 and reconstruction apparatus 200 may be implemented by a computer including a processing apparatus 10 which executes predetermined processing in accordance with a program, an input apparatus 20 for inputting commands, information, and the like to the processing apparatus 10, and an output apparatus 30 for monitoring the results of processing by the processing apparatus 10.

The processing apparatus 10 shown in FIG. 4 includes a CPU 11, a main storage unit 12 which temporarily stores information necessary for processing by the CPU 11, a recording medium 13 which records a program for causing the CPU 11 to execute processing of the share generation apparatus 100 or reconstruction apparatus 200, a data accumulation unit 14 which stores a secret and access structure data, memory control interfaces 15 which control data transfer between the main storage unit 12, the recording medium 13, and the data accumulation unit 14, and I/O interfaces 16 which interface the processing apparatus 10 with the input apparatus 20 and output apparatus 30. These components are connected via a bus 18. Note that the data accumulation unit 14 need not always reside in the processing apparatus 10 and may be arranged independently of the processing apparatus 10. The data accumulation unit 14 may be used as the storage device 300 including the shared secret storage unit 301, random number share storage unit 302, and check data storage unit 303.

The processing apparatus 10 provides the function (to be described later) of the share generation apparatus 100 or reconstruction apparatus 200 in accordance with a program recorded on the recording medium 13. The recording medium 13 may be a magnetic disk, semiconductor memory, optical disk, or another recording medium.

Figure 5:
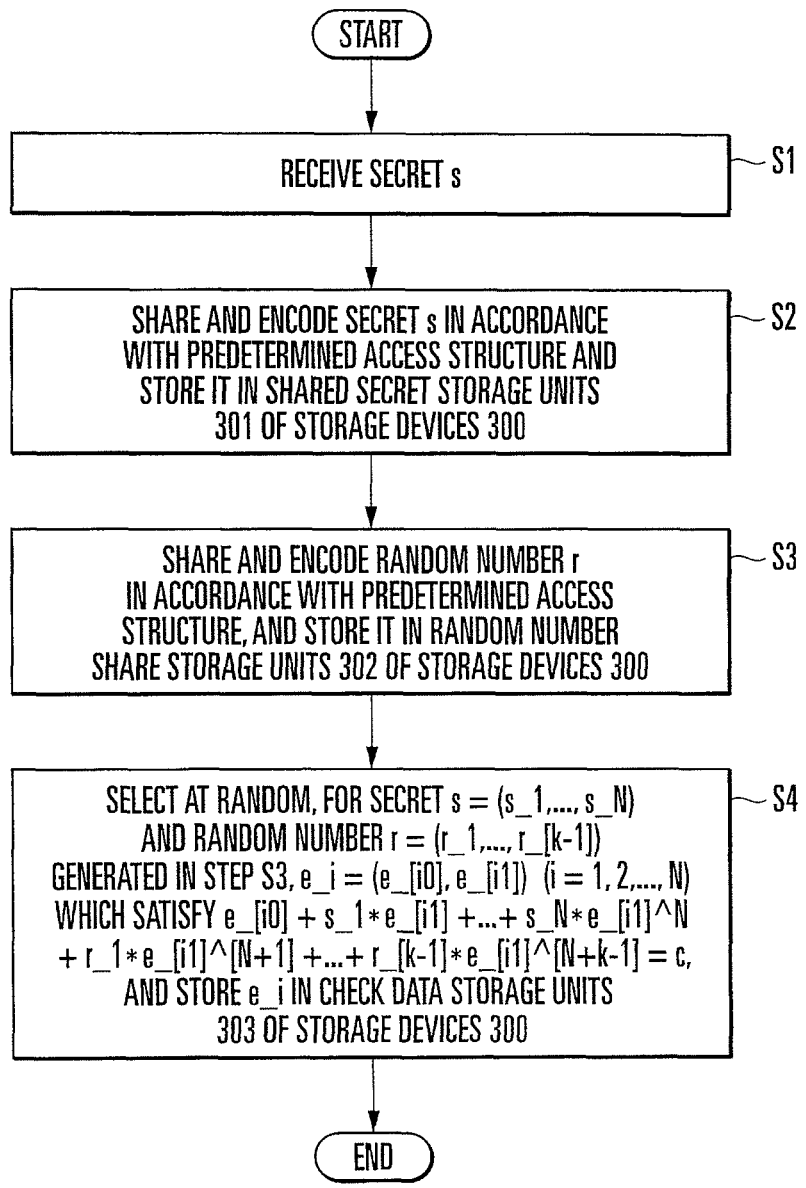
FIG. 5 is a flowchart showing operation processing by the share generation apparatus according to the first exemplary embodiment of the present invention.
Figure 6:
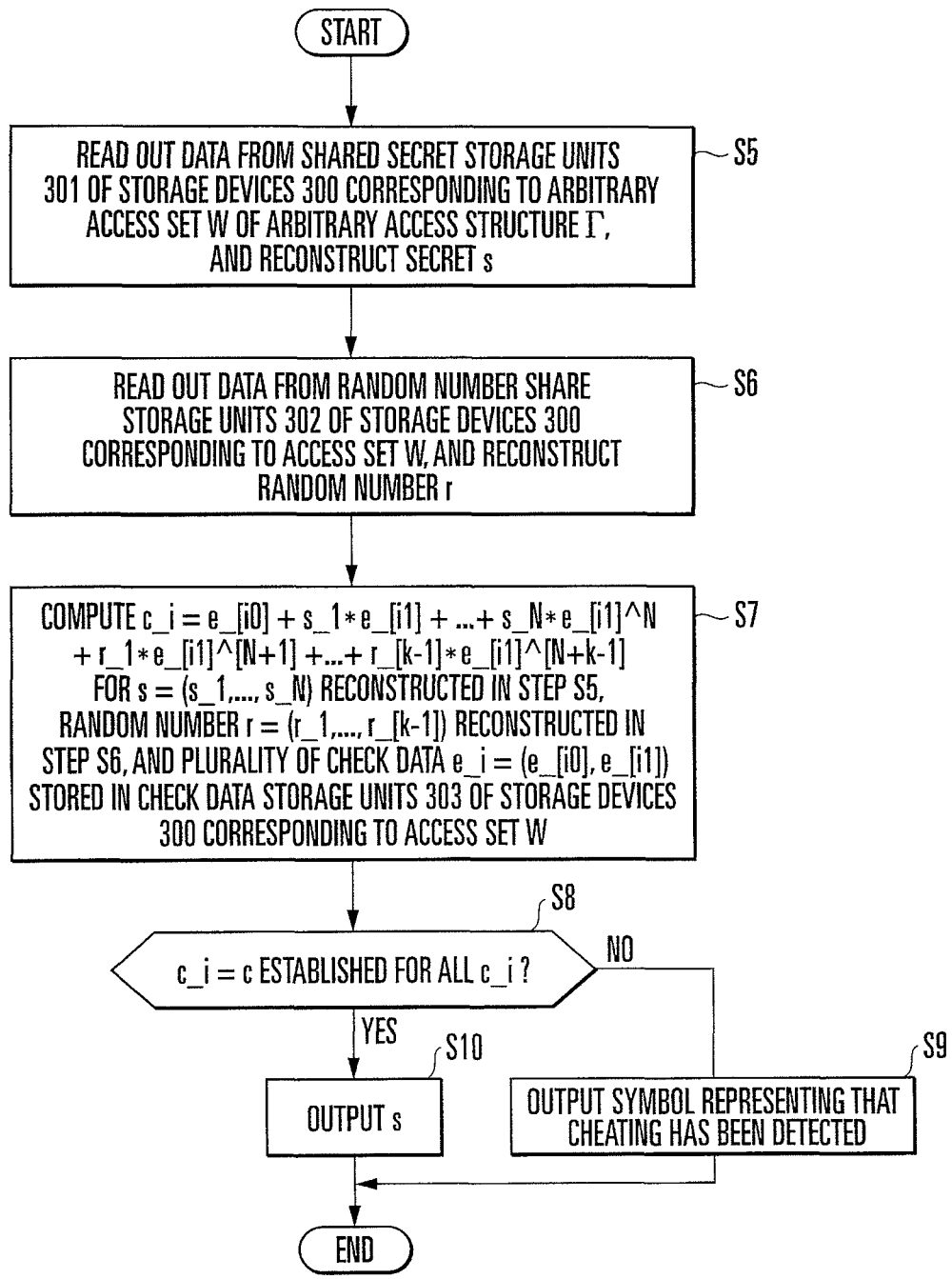
FIG. 6 is a flowchart showing operation processing by the reconstruction apparatus according to the first exemplary embodiment of the present invention.

The operation of the secret sharing system according to the first exemplary embodiment will be explained with reference to FIGS. 5 and 6. FIG. 5 is a flowchart showing the operation of the share generation apparatus 100. FIG. 6 is a flowchart showing the operation of the reconstruction apparatus 200.

As shown in FIG. 5, the share generation apparatus 100 receives the secret s(2) serving as a member of the secret data set S (step S1).

After the secret s is input to the secret sharing unit 101, the share generation apparatus 100 shares and encodes the secret s in accordance with a predetermined access structure F, and stores it in the shared secret storage units 301 of storage devices 300 (step S2).

In the share generation apparatus 100, the random number sharing unit 102 generates the random number r, shares and encodes the generated random number r in accordance with the access structure Γ, and stores it in the random number share storage units 302 of the storage devices 300 (step S3).

In the share generation apparatus 100, the check data generation unit 103 generates, at random for the secret s and the random number r generated in step S3, n check data $e\_i=(e\_[i0], e\_[i1])$ ($i=1, 2, \ldots, n$) which satisfy $$e\_[i0]+s\_1*e\_[i1]+s\_2*e\_[i1]^2+\ldots+s\_N*e\_[i1]^N+r\_1*e\_[i1]^{N+1}+r\_2*e\_[i1]^{N+2}+\ldots+r\_[k-1]*e\_[i1]^{N+k-1}=c$$

The check data generation unit 103 stores the check data $e\_i$ in the check data storage units 303 of the storage devices 300 (step S4).

As shown in FIG. 6, the reconstruction apparatus 200 inputs, to the secret reconstruction unit 201, data read out from the shared secret storage units 301 of the storage devices 300 corresponding to an arbitrary access set W of the access structure Γ. The secret reconstruction unit 201 reconstructs the member s of the secret data set S (step S5).

The reconstruction apparatus 200 inputs, to the random number reconstruction unit 202, data read out from the random number share storage units 302 of the storage devices 300 corresponding to the access set W. The random number reconstruction unit 202 reconstructs the member r of the random number set R (step S6).

For the member s of the secret data set S reconstructed in step S5, r reconstructed in step S6, and all data $e\_i=(e\_[i0], e\_[i1])$ read out from the check data storage units 303 of the storage devices 300 corresponding to the access set W, the reconstruction apparatus 200 computes $$c\_i=e\_[i0]+s\_1*e\_[i1]+s\_2*e\_[i1]^2+\ldots+s\_N*e\_[i1]^N+r\_1*e\_[i1]^{N+1}+r\_2*e\_[i1]^{N+2}+\ldots+r\_[k-1]*e\_[i1]^{N+k-1}$$

(step S7).

If $c\_i=c$ is established for all $c\_i$ computed in step S7 (YES in step S8), the reconstruction apparatus 200 outputs s and ends the processing (step S10). If $c\_i=c$ is not established for any $c\_i$ (NO in step S8), the reconstruction apparatus 200 outputs a symbol representing that cheating has been detected, and ends the processing (step S9).

According to the first exemplary embodiment, cheating can be detected by determining whether reconstructed check data correspond to a reconstructed secret. The data size of shares can be decreased by using a data set having a small number of elements as check data.

Since check data can be selected uniformly at random, high cheating detection ratio can be ensured regardless of a distribution used to select a secret.

Cheating is checked based on a reconstructed secret, and thus can be detected regardless of a secret sharing scheme used.

The second exemplary embodiment of the present invention will be described. A secret sharing system in the second exemplary embodiment includes a share generation apparatus 100, a reconstruction apparatus 200, a verification apparatus 400, and a plurality of storage devices 300_1 to 300_$n$. The storage devices 300_1 to 300_$n$ include shared secret storage units 301_1 to 301_$n$ which store the members of the shared secret data sets VS_1 to VS_n, random number share storage units 302_1 to 302_$n$ which store the members of the random number share data sets VR_1 to VR_n, and check data storage units 303_1 to 303_$n$ which store the members of the check data set E.

The share generation apparatus 100 in the second exemplary embodiment has the arrangement shown in FIG. 1.

The reconstruction apparatus 200 in the second exemplary embodiment has the arrangement shown in FIG. 2. The reconstruction apparatus 200 includes a secret reconstruction unit 201, random number reconstruction unit 202, and cheating detection unit 203.

The secret reconstruction unit 201 and random number reconstruction unit 202 according to the second exemplary embodiment are identical to those in the first exemplary embodiment.

The cheating detection unit 203 reads out the secret data $s=(s\_1, s\_2, \ldots, s\_N) \in S$ reconstructed by the secret reconstruction unit 201, the random number $r=(r\_1, r\_2, \ldots, r\_[k-1]) \in R$ reconstructed by the random number reconstruction unit 202, and check data stored in the check data storage units 303 of the storage devices 300 corresponding to W. For all the readout check data $e\_i=(e\_[i0], e\_[i1]) \in E$, the cheating detection unit 203 determines whether $e\_[i0]+s\_1*e\_[i1]+s\_2*e\_[i1]^2+\ldots+s\_N*e\_[i1]^N+r\_1*e\_[i1]^{N+1}+r\_2*e\_[i1]^{N+2}+\ldots+r\_[k-1]*e\_[i1]^{N+k-1}=c$ is established. If so, the cheating detection unit 203 outputs the reconstructed secret $s \in S$ and the reconstructed random number $r \in R$; otherwise, outputs a symbol representing that cheating has been detected.

Unlike the first exemplary embodiment, the cheating detection unit 203 according to the second exemplary embodiment outputs not only a secret but also a random number.

Figure 3:
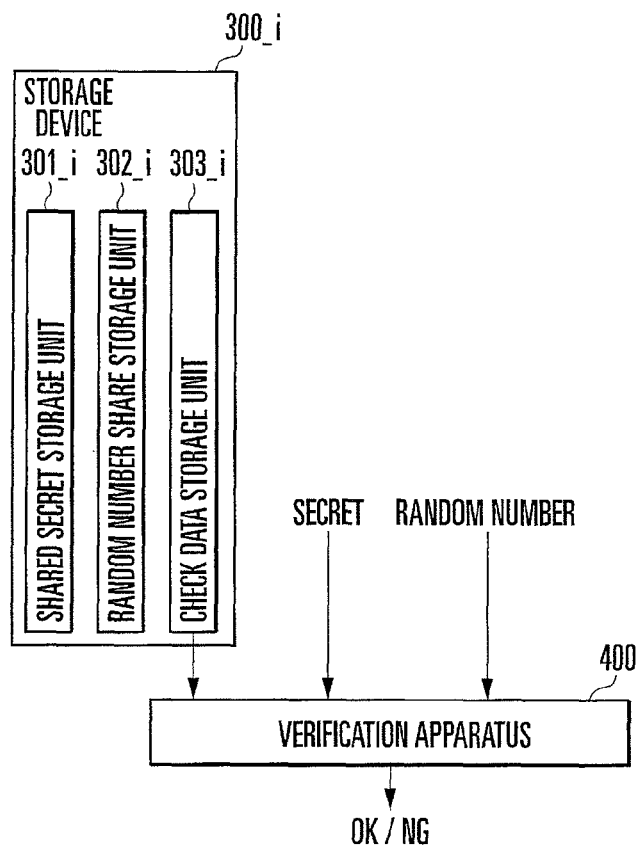
FIG. 3 is a block diagram of the arrangement of a verification apparatus according to the second exemplary embodiment of the present invention.

The verification apparatus 400 according to the second exemplary embodiment will be explained with reference to FIG. 3. The verification apparatus 400 reads out the secret data $s=(s\_1, s\_2, \ldots, s\_N) \in S$ reconstructed by the secret reconstruction unit 201, the random number $r=(r\_1, r\_2, \ldots, r\_[k-1]) \in R$ reconstructed by the random number reconstruction unit 202, and check data stored in the check data storage unit 303_$i$ of the storage device 300_$i$. For the readout check data $e\_i=(e\_[i0], e\_[i1])\in E$, the verification apparatus 400 determines whether $$e\_[i0]+s\_1*e\_[i1]+s\_2*e\_[i1]^2+\ldots+\\s\_N*e\_[i1]^N+r\_1*e\_[i1]^{[N+1]}+\\r\_2*e\_[i1]^{[N+2]}+\ldots+r\_[k-1]*e\_[i1]^{[N+k-1]}=c$$

is established. If so, the verification apparatus 400 outputs a symbol representing that the reconstructed secret is correct; otherwise, outputs a symbol representing that cheating has been detected.

In the second exemplary embodiment, even when the storage device 300_i does not provide data in reconstructing a secret, whether the reconstructed secret s has not been forged can be verified by inputting, to the verification apparatus 400, the secret s and random number r output from the reconstruction apparatus 200, and check data stored in the storage device 300_i after reconstructing the secret.

Next, examples of the present invention will be described.

First Example

A secret sharing system according to the first example employs $GF(p^N)$ (p: prime, GF: Galois field) as a data set of the secret $s=(s\_1, s\_2, \ldots, s\_N)$, a member of $GF(p^{[k-1]})$ as the random number data $r=(r\_1, r\_2, \ldots, r\_[k\_1])$, and $GF(p)^2$ as the check data $e=(e\_0, e\_1)$. In the first example, "+", "−", "*", "/", and "^" indicate addition, subtraction, multiplication, division, and power calculation on a finite field, respectively.

In the first example, the access structure in secret sharing is a (k,n) threshold type access structure. A secret sharing unit 101 and random number sharing unit 102 can perform sharing and encoding using a (k,n) threshold scheme described in reference 1. A secret reconstruction unit 201 and random number reconstruction unit 202 can reconstruct a secret and random number using a reconstruction method corresponding to the (k,n) threshold scheme.

A share generation apparatus 100 and reconstruction apparatus 200 according to the first example will be explained. The share generation apparatus 100 according to the first example receives the secret $s=(s\_1, s\_2, \ldots, s\_N) \in GF(p^N)$ (each $s\_i \in GF(p)$).

When the share generation apparatus 100 receives the secret s, the secret sharing unit 101 generates at random a polynomial of degree k−1 in which the constant term in $GF(p^N)$ is s. This polynomial of degree k−1 will be given by $f\_s(x)$.

The secret sharing unit 101 computes $f\_s(i\_1)$, $f\_s(i\_2), \ldots, f\_s(i\_n)$ for different $i\_1, i\_2, \ldots, i\_n$, and stores the computation results in a shared secret storage unit 301_1 of a storage device 300_1, a shared secret storage unit 301_2 of a storage device 300_2, ..., a shared secret storage unit 301_n of a storage device 300_n.

The random number sharing unit 102 generates the random number r serving as a member of $GF(p^{[k-1]})$, and generates at random a polynomial of degree k−1 in which the constant term in $GF(p^{[k-1]})$ is r. This polynomial of degree k−1 will be given by $f\_r(x)$.

The random number sharing unit 102 computes $f\_r(i\_1)$, $f\_r(i\_2), \ldots, f\_r(i\_n)$ for $i\_1, i\_2, \ldots, i\_n$, and stores the computation results in a random number share storage unit 302_1 of the storage device 300_1, a random number share storage unit 302_2 of the storage device 300_2, ..., a random number share storage unit 302_n of the storage device 300_n.

A check data generation unit 103 selects $e\_[i1]$ at random from $GF(p)$ for $i=1, 2, \ldots, n$. Then, the check data generation unit 103 computes $e\_[i0]$ ($i=1, 2, \ldots, n$) in accordance with $$e\_[i0]=-(s\_1*e\_[i1]+s\_2*e\_[i1]^2+\ldots+\\s\_N*e\_[i1]^N+r\_1*e\_[i1]^{[N+1]}+\\r\_2*e\_[i1]^{[N+2]}+\ldots+r\_[k-1]*e\_[i1]^{[N+k-1]})$$

The check data generation unit 103 stores the obtained $(e\_[i0], e\_[i1])$ $(i=1, 2, \ldots, n)$ in a check data storage unit 303_i of a storage device 300_i.

To the contrary, the reconstruction apparatus 200 according to the first example reads out data from the shared secret storage units 301 of the storage devices 300_[i_1], 300_[i_2], ..., 300_[i_k]. These data will be described as $vs\_[i\_1], vs\_[i\_2], \ldots, vs\_[i\_k]$.

The secret reconstruction unit 201 receives $(i\_1, vs\_[i\_1])$, $(i\_2, vs\_[i\_2]), \ldots, (i\_k, vs\_[i\_k])$, and generates $g\_s(0)$ of a polynomial $g\_s(x)$ of degree k−1 in $GF(p^N)$ passing through the coordinates $(i\_1, vs\_[i\_1]), (i\_2, vs\_[i\_2]), \ldots, (i\_k, vs\_[i\_k])$. More specifically, the secret reconstruction unit 201 computes $s'=g\_s(0)$ according to a method of solving simultaneous equations, a method using Lagrange's interpolation, or the like.

The reconstruction apparatus 200 reads out data from the random number share storage units 302 of the storage devices 300_[i_1], 300_[i_2], ..., 300_[i_k]. These data will be described as $vr\_[i\_1], vr\_[i\_2], \ldots, vr\_[i\_k]$.

The random number reconstruction unit 202 receives $(i\_1, vr\_[i\_1]), (i\_2, vr\_[i\_2]), \ldots, (i\_k, vr\_[i\_k])$, and generates $g\_r(0)$ of a polynomial $g\_r(x)$ of degree k−1 in $GF(p^{[k-1]})$ passing through the coordinates $(i\_1, vr\_[i\_1]), (i\_2, vr\_[i\_2]), \ldots, (i\_k, vr\_[i\_k])$. More specifically, the random number reconstruction unit 202 computes $r'=g\_r(0)$ according to a method of solving simultaneous equations, a method using Lagrange's interpolation, or the like.

Then, the reconstruction apparatus 200 reads out data from the check data storage units 303 of the storage devices 300_[i_1], 300_[i_2], ..., 300_[i_k]. These data will be described as $e\_[i\_1], e\_[i\_2], \ldots, e\_[i\_k]$ (each $e\_[i\_j]=(e\_[i\_j0], e\_[i\_j1])$).

A cheating detection unit 203 receives $s'=(s'\_1, s'\_2, \ldots, s'\_N), r'=(r'\_1, r'\_2, \ldots, r'\_[k-1])$, and $e[i\_1]=(e[i\_10], e[i\_11]), e[i\_2]=(e[i\_20], e[i\_21]), \ldots, e[i\_k]=(e[i\_k0], e[i\_k1])$. For $j=1, 2, \ldots, k$, the cheating detection unit 203 checks whether $e\_[i\_j0]+(s'\_1*e\_[i\_j1]+s'\_2*e\_[i\_j1]^2+\ldots+s'\_N*e\_[i\_j1]^N+r'\_1*e\_[i\_j1]^{[N+1]}+r'\_2*e\_[i\_j1]^{[N+2]}+\ldots+r'\_[k-1]*e\_[i\_j1]^{[N+k-1]})=0$ is established. If so, the cheating detection unit 203 outputs the secret s'; otherwise, outputs a symbol such as ⊥ representing that cheating has been detected.

In the secret sharing system according to the first example, the size of a secret is $p^N$, that of shares is $p^{[N+k+1]}$, and the cheating detection ratio is $(1-(N+k+1)/p)$.

Letting s be the size of a secret and $(1-\epsilon)$ be the cheating detection ratio, the size of shares can be substantially given by $s*((\log s)/\epsilon)^{[k+1]}$.

The size of shares in a secret sharing scheme described in the above-mentioned reference 2 is $((s-1)(k-1)/\epsilon+k)^2$, and that of shares in reference 6 is $s^2/\epsilon$. When s is large and k is small, the size of shares in the first example is smaller than each of these two sizes.

Second Example

A secret sharing system according to the second example also adopts $GF(p^N)$ (p: prime, GF: Galois field) as a data set of the secret $s=(s\_1, s\_2, \ldots, s\_N)$, a member of $GF(p^{[k-1]})$ as the random number data r=(r_1, r_2, ..., r_[k_1]), and GF(p)^2 as the check data e=(e_0, e_1). In the second example, "+", "−", "*", "/", and "^" indicate addition, subtraction, multiplication, division, and power calculation on a finite field, respectively.

The access structure in secret sharing is an (n,n) threshold type access structure. A secret sharing unit 101 and random number sharing unit 102 perform sharing and encoding using an (n,n) threshold scheme described in reference 4. A secret reconstruction unit 201 and random number reconstruction unit 202 reconstruct a secret and random number using a reconstruction method corresponding to the (n,n) threshold scheme.

A share generation apparatus 100 and reconstruction apparatus 200 according to the second example will be explained. The share generation apparatus 100 receives the secret s=(s_1, s_2, ..., s_N)∈GF(p^N) (each s_i∈GF(p)).

When the share generation apparatus 100 receives the secret s, the secret sharing unit 101 selects at random members vs_1, vs_2, ..., vs_n of GF(p^N) that meet vs_1+vs_2+...+vs_n=s, and stores each vs_i (i=1, 2, ..., n) in a shared secret storage unit 301_i of a storage device 300_i.

The random number sharing unit 102 generates the random number r serving as a member of GF(p^[n−1]), and selects at random members vr_1, vr_2, ..., vr_n of GF(p^[n−1]) that meet vr_1+vr_2+...+vr_n=r. The random number sharing unit 102 stores each vr_i (i=1, 2, ..., n) in a random number share storage unit 302_i of the storage device 300_i.

A check data generation unit 103 selects e_[i1] at random from GF(p) for i=1, 2, ..., n. Then, the check data generation unit 103 computes e_[i0] (i=1, 2, ..., n) in accordance with $$e\_[i0] = -(s\_1 * e\_[i1] + s\_2 * e\_[i1]^2 + \ldots + s\_N * e\_[i1]^N + r\_1 * e\_[i1]^{[N+1]} + r\_2 * e\_[i1]^{[N+2]} + \ldots + r\_[n-1] * e\_[i1]^{[N+n-1]})$$

The check data generation unit 103 stores the obtained (e_[i0], e_[i1]) (i=1, 2, ..., n) in a check data storage unit 303_i of the storage device 300_i.

The reconstruction apparatus 200 reads out data from the shared secret storage units 301 of the storage devices 300_1, 300_2, ..., 300_n. These data will be described as vs_1, vs_2, ..., vs_n.

The secret reconstruction unit 201 computes s' based on s'=vs_1+vs_2+...+vs_n.

The reconstruction apparatus 200 reads out data from the random number share storage units 302 of the storage devices 300_1, 300_2, ..., 300_n. These data will be described as vr_1, vr_2, ..., vr_n.

The random number reconstruction unit 202 computes r' based on r'=vr_1+vr_2+...+vr_n.

Then, the reconstruction apparatus 200 reads out data from the check data storage units 303 of the storage devices 300_1, 300_2, ..., 300_n. These data will be described as e_1, e_2, ..., e_n (each e_i=(e_[i0], e_[i1])).

A cheating detection unit 203 receives s'=(s'_1, s'_2, ..., s'_N), r'=(r'_1, r'_2, ..., r'_[k−1]), and e_1=(e[i0], e[i1]) (i=1, 2, ..., n). For i=1, 2, ..., n, the cheating detection unit 203 checks whether $$e\_[i0] + (s'\_1 * e\_[i1] + s'\_2 * e\_[i1]^2 + \ldots + s'\_N * e\_[i1]^N + r'\_1 * e\_[i1]^{[N+1]} + r'\_2 * e\_[i1]^{[N+2]} + \ldots + r'\_[n-1] * e\_[i1]^{[N+n-1]}) = 0$$

is established. If so, the cheating detection unit 203 outputs the secret s'; otherwise, outputs a symbol such as ⊥ representing that cheating has been detected.

In the secret sharing system according to the first example, the size of a secret is p^N, that of shares is p^[N+k+1], and the cheating detection ratio is (1−(N+n+1)/p). In the second example, letting s be the size of a secret and (1−ϵ) be the cheating detection ratio, the size of shares can be substantially given by s*((log s)/ϵ)^[n+1].

According to the second example, the scheme can be configured based on the (n,n) threshold secret sharing scheme. Forgery of (n−1) shares can be prevented.

Third Example

A secret sharing system according to the third example pertains to the exemplary embodiment in which the cheating detection unit 203 outputs not only a secret but also a random number. The third example employs GF(p^N) (p: prime, GF: Galois field) as a data set of the secret s=(s_1, s_2, ..., s_N), a member of GF(p^[k−1]) as the random number data r=(r_1, r_2, ..., r_[k_1]), and GF(p)^2 as the check data e=(e_0, e_1). In the third example, "+", "−", "*", "/", and "^" indicate addition, subtraction, multiplication, division, and power calculation on a finite field, respectively.

In the third example, similar to the first example, the access structure in secret sharing is a (k,n) threshold type access structure. A secret sharing unit 101 and random number sharing unit 102 perform sharing and encoding using a (k,n) threshold scheme described in reference 1. A secret reconstruction unit 201 and random number reconstruction unit 202 reconstruct a secret and random number using a reconstruction method corresponding to the (k,n) threshold scheme.

A share generation apparatus 100 and reconstruction apparatus 200 according to the third example will be explained. The share generation apparatus 100 is identical to that in the first example. In contrast, the reconstruction apparatus 200 reads out data from shared secret storage units 301 of storage devices 300_[i_1], 300_[i_2], ..., 300_[i_k]. These data will be described as vs_[i_1], vs_[i_2], ..., vs_[i_k].

The secret reconstruction unit 201 and random number reconstruction unit 202 according to the third example are identical to those according to the first example.

A cheating detection unit 203 receives data e_[i_1], e_[i_2], ..., e_[i_k] (each e[i_j]=(e[i_j0], e[i_j1])) stored in check data storage units 303 of the storage devices 300_[i_1], 300_[i_2], ..., 300_[i_k], output s'=(s'_1, s'_2, ..., s'_N) from the secret reconstruction unit 201, and r'=(r'_1, r'_2, ..., r'_[k−1]) from the random number reconstruction unit.

For j=1, 2, ..., k, the cheating detection unit 203 checks whether $$e\_[i\_j0] + (s'\_1 * e\_[i\_j1] + s'\_2 * e\_[i\_j1]^2 + \ldots + s'\_N * e\_[i\_j1]^N + r'\_1 * e\_[i\_j1]^{[N+1]} + r'\_2 * e\_[i\_j1]^{[N+2]} + \ldots + r'\_[k-1] * e\_[i\_j1]^{[N+k-1]}) = 0$$

is established. If so, the cheating detection unit 203 outputs the secret s' and random number r'; otherwise, outputs a symbol such as ⊥ representing that cheating has been detected.

A verification apparatus 400 according to the third example receives check data e_i=(e[i0], e[i1]) read out from each check data storage unit 303_i of the storage device 300_i, the secret s'=(s'_1, s'_2, ..., s'_N), and the random number r'=(r'_1, r'_2, ..., r'_[k−1]). The verification apparatus 400 determines whether $$e\_[i0] + (s'\_1 * e\_[i1] + s'\_2 * e\_[i1]^2 + \ldots + s'\_N * e\_[i1]^N + r'\_1 * e\_[i1]^{[N+1]} + r'\_2 * e\_[i1]^{[N+2]} + \ldots + r'\_[k-1] * e\_[i1]^{[N+k-1]}) = 0$$

is established. If so, the verification apparatus 400 outputs a symbol representing that the reconstructed secret is correct; otherwise, outputs a symbol representing that cheating has been detected.

By using the verification apparatus 400, even when the storage device 300_i has not input a share to the reconstruction unit in reconstructing a secret, whether the reconstructed secret s' has not been forged can be verified based on check data stored in the check data storage unit 303_i of the storage device 300_i, the reconstructed secret s', and the reconstructed random number r'.

Note that the program to execute the processes shown in the flowcharts by the CPU configures a program according to the present invention. As a recording medium which records the program, a semiconductor storage, optical and/or magnetic storage, and the like are available. Almost the same effects as those in the present invention can be obtained by using the program and recording medium in a system or the like different in arrangement as those in the above-described exemplary embodiments and examples, and executing the program by the CPU of the system or the like.

The present invention has been described in detail based on preferred exemplary embodiments and examples, but is not limited to them. The present invention can be variously changed and modified without departing from the scope of the invention. For example, the storage devices 300_1 to 300_n are arranged independently of the share generation apparatus 100 and reconstruction apparatus 200 in FIGS. 1 and 2. Alternatively, the storage devices 300_1 to 300_n may be incorporated in the share generation apparatus or reconstruction apparatus 200 as building components of the share generation apparatus or reconstruction apparatus 200.

This application is based upon and claims the benefit of priority from Japanese Patent Application No. 2007-320830, filed on Dec. 12, 2007, the disclosure of which is incorporated herein in its entirety by reference.

The invention claimed is:

1. A share generation apparatus comprising:
   a processing unit comprising at least one central unit (CPU);
   a secret sharing unit, executed by the processing unit, that shares and encodes a secret in accordance with an access structure of a secret sharing scheme;
   a random number sharing unit, executed by the processing unit, that shares and encodes a random number in accordance with the access structure of the secret sharing scheme; and
   a check data generation unit, executed by the processing unit, that generates check data corresponding to the secret and the random number,
   wherein for a secret $s=(s\_1, s\_2, \ldots, s\_N)$ serving as a member of a field having a number $p^N$ of elements, a random number $r=(r\_1, r\_1, \ldots, r\_[k-1])$ serving as a member of a field having a number $p^{[k-1]}$ of elements, and a predetermined constant c, said check data generation unit selects at random n members $(e\_[10], e\_[11])$, $(e\_[20], e\_[21]) \ldots (e\_[n0], e\_[n1])$ of $GF(p)^2$ that satisfy $e\_[i0]+s\_1*e\_[i1]+s\_2*e\_[i1]^2+ \ldots +s\_N*e\_[i1]^N+r\_1*e\_[i1]^{[N+1]}+r\_2*e\_[i1]^{[N+2]}+ \ldots + r\_[k-1]*e\_[i1]^{[N+k-1]}=c$
   where p is a prime, and k is a maximum number of shares necessary to reconstruct a secret.

2. A share generation apparatus according to claim 1, wherein said secret sharing unit uses an access structure of a (k,n) threshold scheme as the access structure of the secret sharing scheme.

3. A share generation apparatus according to claim 1, wherein said secret sharing unit uses, as the secret sharing scheme, an (n,n) threshold scheme of reconstructing a secret by adding all shares.

4. A reconstruction apparatus comprising:
   a processing unit comprising at least one central unit (CPU);
   storage units that store a secret shared and encoded in accordance with an access structure of a secret sharing scheme, a random number shared and encoded in accordance with the access structure of the secret sharing scheme, and check data generated in correspondence with the secret and the random number;
   a secret reconstruction unit, executed by the processing unit, that reads out the shared/encoded secret from said storage units corresponding to the access structure of the secret sharing scheme, and reconstructs the secret in accordance with the access structure;
   a random number reconstruction, executed by the processing unit, unit that reads out the shared/encoded random number from said storage units corresponding to the access structure of the secret sharing scheme, and reconstructs the random number in accordance with the access structure; and
   a cheating detection unit, executed by the processing unit, that reads out the check data from all said storage units corresponding to the access structure of the secret sharing scheme, when all the readout check data correspond to the secret reconstructed by said secret reconstruction unit and the random number reconstructed by said random number reconstruction unit, outputs the reconstructed secret, and when not all the readout check data correspond to the secret reconstructed by said secret reconstruction unit and the random number reconstructed by said random number reconstruction unit, outputs a signal representing cheating,
   wherein said cheating detection unit receives a secret $s=(s\_1, s\_2 \ldots s\_N)$ serving as a member of a field having a number $p^N$ of elements, a random number $r=(r\_1, r\_2, \ldots r\_[k-1])$ serving as a member of a field having a number $p^{[k-1]}$ of elements, and check data $(e\_[i\_10], e\_[i\_11]), (e\_[i\_20], e\_[i\_21]) \ldots (e\_[i\_m0], e\_[i\_m1])$ corresponding to the access structure of the secret sharing scheme, and
   determines that the check data correspond to the secret reconstructed by said secret reconstruction unit when $e\_[i\_j0]+s\_1*e\_[i\_j1]+s\_2*e\_[i\_j1]^2+ \ldots + s\_N*e\_[i\_j1]^N+r\_1*e\_[i\_j1]^{[N+1]}+r\_2*e\_[i\_j1]^{[N+2]}+ \ldots +r\_[k-1]*e\_[i\_j1]^{[N+k-1]}=c$
   where p is a prime, and k is a maximum number of shares necessary to reconstruct a secret is satisfied for a predetermined constant c and an arbitrary $j=1, 2 \ldots m$.

5. A reconstruction apparatus according to claim 4, wherein an access structure of a (k,n) threshold scheme is used as the access structure of the secret sharing scheme.

6. A reconstruction apparatus according to claim 4, wherein an (n,n) threshold scheme of reconstructing a secret by adding all shares is used as the secret sharing scheme.

7. A verification apparatus which receives a secret $s'=(s'\_1, s'\_2 \ldots s'\_N)$ serving as a member among a number $p^N$ of elements, a random number $r'=(r'\_1, r'\_2 \ldots r'\_[k-1])$ serving as a member among a number $p^{[k-1]}$ of elements, and check data $(e\_[i\_10], e\_[i\_11])$ generated by a share generation apparatus, determines that the secret s' has not been forged when
$e\_[i0]+s'\_1*e\_[i1]+s'\_2*e\_[i1]^2+\ldots+s'\_N*e\_[i1]^N+r'\_1*e\_[i1]^{[N+1]}+r'\_2*e\_[i1]^{[N+2]}+\ldots+r'\_[k-1]*e\_[i1]^{[N+k-1]}=c$ where p is a prime, and k is a maximum number of shares necessary to reconstruct a secret is satisfied for a predetermined constant c, and when the verification apparatus determines that the secret s' has not been forged, outputs a signal representing that no forgery of the secret has been verified, and when the verification apparatus determines that the secret s' has been forged, outputs a signal representing cheating, wherein the share generation apparatus includes:

a processing unit comprising at least one central unit (CPU);

a secret sharing unit, executed by the processing unit, that shares and encodes a secret in accordance with an access structure of a secret sharing scheme;

a random number sharing unit, executed by the processing unit, that shares and encodes a random number in accordance with the access structure of the secret sharing scheme; and a check data generation unit, executed by the processing unit, that generates check data corresponding to the secret and the random number, and for a secret $s=(s\_1, s\_2 \ldots s\_N)$ serving as a member of a field having the number $p^N$ of elements, a random number $r=(r\_1, r\_2 \ldots r\_[k-1])$ serving as a member of a field having the number $p^{[k-1]}$ of elements, and the predetermined constant c, said check data generation unit selects at random n members $(e\_[10], e\_[11])$, $(e\_[20], e\_[21]) \ldots (e\_[n0], e\_[n1])$ of $GF(p)^2$ that satisfy $$e\_[i0]+s\_1*e\_[i1]+s\_2*e\_[i1]^2+\ldots+s\_N*e\_[i1]^N+r\_1*e\_[i1]^{[N+1]}+r\_2*e\_[i1]^{[N+2]}+\ldots+r\_[k-1]*e\_[i1]^{[N+k-1]}=c$$

where p is a prime, and k is a maximum number of shares necessary to reconstruct a secret.

8. A secret sharing system comprising a share generation apparatus, storage devices, and a reconstruction apparatus, said secret sharing system further comprising processing unit comprising at least one central processing unit (CPU), and said share generation apparatus including:

a secret sharing unit, executed by the processing unit, that shares and encodes a secret in accordance with an access structure of a secret sharing scheme;

a random number sharing unit, executed by the processing unit, that shares and encodes a random number in accordance with the access structure of the secret sharing scheme; and a check data generation unit, executed by the processing unit, that generates check data corresponding to the secret and the random number, said storage devices storing the shared/encoded secret, the shared/encoded random number, and the check data, and said reconstruction apparatus including:

a secret reconstruction unit, executed by the processing unit, that reads out the shared/encoded secret from said storage devices corresponding to the access structure, and reconstructs the secret in accordance with the access structure;

a random number reconstruction unit, executed by the processing unit, that reads out the shared/encoded random number from said storage devices corresponding to the access structure, and reconstructs the random number in accordance with the access structure; and a cheating detection unit, executed by the processing unit, that reads out the check data from all said storage devices corresponding to the access structure, when all the readout check data correspond to the secret reconstructed by said secret reconstruction unit and the random number reconstructed by said random number reconstruction unit, outputs the reconstructed secret, and when not all the readout check data correspond to the secret reconstructed by said secret reconstruction unit and the random number reconstructed by said random number reconstruction unit, outputs a signal representing cheating, wherein for a secret $s=(s\_1, s\_2 \ldots s\_N)$ serving as a member of a field having a number $p^N$ of elements, a random number $r=(r\_1, r\_2 \ldots r\_[k-1])$ serving as a member of a field having a number $p^{[k-1]}$ of elements, and a predetermined constant c, said check data generation unit selects at random n members $(e\_[10], e\_[11])$, $(e\_[20], e\_[21]) \ldots (e\_[n0], e\_[n1])$ of $GF(p)^2$ that satisfy $$e\_[i0]+s\_1*e\_[i1]+s\_2*e\_[i1]^2+\ldots+s\_N*e\_[i1]^N+r\_1*e\_[i1]^{[N+1]}+r\_2*e\_[i1]^{[N+2]}+\ldots+r\_[k-1]*e\_[i1]^{[N+k-1]}=c$$

where p is a prime, and k is a maximum number of shares necessary to reconstruct a secret, and said cheating detection unit receives the secret $s=(s\_1, s\_2 \ldots s\_N)$ serving as a member of the field having the number $p^N$ of elements, the random number $r=(r\_1, r\_2 \ldots r\_[k-1])$ serving as a member of the field having the number $p^{[k-1]}$ of elements, and check data $(e\_[i\_10], e\_[i\_11])$, $(e\_[i\_20], e\_[i\_21]) \ldots (e\_[i\_m0], e\_[i\_m1])$ corresponding to the access structure of the secret sharing scheme, and determines that the check data correspond to the secret reconstructed by said secret reconstruction unit when $$e\_[j0]+s\_1*e\_[j1]+s\_2*e\_[j1]^2+\ldots+s\_N*e\_[j1]^N+r\_1*e\_[j1]^{[N+1]}+r\_2*e\_[j1]^{[N+2]}+\ldots+r\_[k-1]*e\_[j1]^{[N+k-1]}=c$$

where p is a prime, and k is a maximum number of shares necessary to reconstruct a secret is satisfied for the predetermined constant c and an arbitrary j=1, 2 m.

9. A secret sharing system according to claim 8, wherein an access structure of a (k,n) threshold scheme is used as the access structure of the secret sharing scheme.

10. A secret sharing system according to claim 8, wherein an (n,n) threshold scheme of reconstructing a secret by adding all shares is used as the secret sharing scheme.

11. A secret sharing system comprising a share generation apparatus, storage devices, a reconstruction apparatus, and a verification apparatus, said secret sharing system further comprising processing unit comprising at least one central processing unit (CPU), and said share generation apparatus including:

a secret sharing unit, executed by the processing unit, that shares and encodes a secret in accordance with an access structure of a secret sharing scheme;

a random number sharing unit, executed by the processing unit, that shares and encodes a random number in accordance with the access structure of the secret sharing scheme; and a check data generation unit, executed by the processing unit, that generates check data corresponding to the secret and the random number, said storage devices storing the shared/encoded secret, the shared/encoded random number, and the check data, and said reconstruction apparatus including:

a secret reconstruction unit, executed by the processing unit, that reads out the shared/encoded secret from said storage devices corresponding to the access structure, and reconstructs the secret in accordance with the access structure;

a random number reconstruction unit, executed by the processing unit, that reads out the shared/encoded random number from said storage devices corresponding to the access structure, and reconstructs the random number in accordance with the access structure; and a cheating detection unit, executed by the processing unit, that reads out the check data from all said storage devices corresponding to the access structure, when all the readout check data correspond to the secret reconstructed by said secret reconstruction unit and the random number reconstructed by said random number reconstruction unit, outputs the reconstructed secret and the reconstructed random number, and when not all the readout check data correspond to the secret reconstructed by said secret reconstruction unit and the random number reconstructed by said random number reconstruction unit, outputs a signal representing cheating, and wherein said verification apparatus acquires the secret reconstructed by said secret reconstruction unit, the random number reconstructed by said random number reconstruction unit, and the check data stored in said storage devices, when said verification apparatus determines that the secret has not been forged, outputs a signal representing that no forgery of the secret has been verified, and when said verification apparatus determines that the secret has been forged, outputs a signal representing cheating, for a secret $s=(s\_1, s\_2 \ldots s\_N)$ serving as a member of a field having a number $p^N$ of elements, a random number $r=(r\_1, r\_2 \ldots r\_[k-1])$ serving as a member of a field having a number $p^{[k-1]}$ of elements, and a predetermined constant c, said check data generation unit selects at random n members $(e\_[10], e\_[11]), (e\_[20], e\_[21]) \ldots (e\_[n0], e\_[n1])$ of $GF(p)^2$ that satisfy $$e\_[i0]+s\_1*e\_[i1]+s\_2*e\_[i1]^2+\ldots+s\_N*e\_[i1]^N+r\_1*e\_[i1]^{[N+1]}+r\_2*e\_[i1]^{[N+2]}+\ldots+r\_[k-1]*e\_[i1]^{[N+k-1]}=c$$

where p is a prime, and k is a maximum number of shares necessary to reconstruct a secret, said cheating detection unit receives the secret $s=(s\_1, s\_2 \ldots s\_N)$ serving as a member of the field having the number $p^N$ of elements, the random number $r=(r\_1, r\_2 \ldots r\_[k-1])$ serving as a member of the field having the number $p^{[k-1]}$ of elements, and check data $(e\_[i\_10], e\_[i\_11]), (e\_[i\_20], e[i\_21]) \ldots (e\_[i\_m0], e\_[i\_m1])$ corresponding to the access structure of the secret sharing scheme, and determines that the check data correspond to the secret reconstructed by said secret reconstruction unit when $$e\_[j0]+s\_1*e\_[j1]+s\_2*e\_[j1]^2+\ldots+s\_N*e\_[j1]^N+r\_1*e\_[j1]^{[N+1]}+r\_2*e\_[j1]^{[N+2]}+\ldots+r\_[k-1]*e\_[i1]^{[N+k-1]}=c$$

where p is a prime, and k is a maximum number of shares necessary to reconstruct a secret is satisfied for the predetermined constant c and an arbitrary j=1, 2 ... m, and said verification apparatus receives a secret $s'=(s'\_1, s'\_2 \ldots s'\_N)$ serving as a member among the number $p^N$ of elements, a random number $r'=(r'\_1, r'\_2 \ldots r'\_[k-1])$ serving as a member among the number $p^{[k-1]}$ of elements, and the check data $(e\_[i\_10], e\_[i\_11])$, and determines that the secret s' has not been forged when $$e\_[i0]+s'\_1*e\_[i1]+S'\_2*e\_[i1]^2+\ldots+s'\_N*e\_[i1]^N+r'\_1*e\_[i1]^{[N+1]}+r'\_2*e\_[i1]^{[N+2]}+\ldots+r'\_[k-1]*e\_[i1]^{[N+k-1]}=c$$

where p is a prime, and k is a maximum number of shares necessary to reconstruct a secret is satisfied for the predetermined constant c.

12. A secret sharing system according to claim 11, wherein an access structure of a (k,n) threshold scheme is used as the access structure of the secret sharing scheme.

13. A secret sharing system according to claim 11, wherein an (n,n) threshold scheme of reconstructing a secret by adding all shares is used as the secret sharing scheme.

14. A share generation apparatus comprising:

secret sharing means for sharing and encoding a secret in accordance with an access structure of a secret sharing scheme;

random number sharing means for sharing and encoding a random number in accordance with the access structure of the secret sharing scheme; and check data generation means for generating check data corresponding to the secret and the random number, wherein for a secret $s=(s\_1, s\_2 \ldots s\_N)$ serving as a member of a field having a number $p^N$ of elements, a random number $r=(r\_1, r\_2 \ldots r\_[k-1])$ serving as a member of a field having a number $p^{[k-1]}$ of elements, and a predetermined constant c, said check data generation means selects at random n members $(e\_[10], e\_[11]), (e\_[20], e\_[21]) \ldots (e\_[n0], e\_[n1])$ of $GF(p)^2$ that satisfy $$e\_[i0]+s\_1*e\_[i1]+s\_2*e\_[i1]^2+\ldots+s\_N*e\_[i1]^N+r\_1*e\_[i1]^{[N+1]}+r\_2*e\_[i1]^{[N+2]}+\ldots+r\_[k-1]*e\_[i1]^{[N+k-1]}=c$$

where p is a prime, and k is a maximum number of shares necessary to reconstruct a secret.

15. A reconstruction apparatus comprising:

storage means for storing a secret shared and encoded in accordance with an access structure of a secret sharing scheme, a random number shared and encoded in accordance with the access structure of the secret sharing scheme, and check data generated in correspondence with the secret and the random number;

secret reconstruction means for reading out the shared/encoded secret from said storage means corresponding to the access structure of the secret sharing scheme, and reconstructing the secret in accordance with the access structure;

random number reconstruction means for reading out the shared/encoded random number from said storage means corresponding to the access structure of the secret sharing scheme, and reconstructing the random number in accordance with the access structure; and cheating detection means for reading out the check data from all said storage means corresponding to the access structure of the secret sharing scheme, when all the readout check data correspond to the secret reconstructed by said secret reconstruction means and the random number reconstructed by said random number reconstruction means, outputting the reconstructed secret, and when not all the readout check data correspond to the secret reconstructed by said secret reconstruction means and the random number reconstructed by said random number reconstruction means, outputting a signal representing cheating, wherein said cheating detection means receives a secret s=(s_1, s_2 ... s_N) serving as a member of a field having a number p^N of elements, a random number r=(r_1, r_2 ... r_[k−1]) serving as a member of a field having a number p^[k−1] of elements, and check data (e_[i_10], e_[i_11]), (e_[i_20], e_[i_21]) ... (e_[i_m0], e_[i_m1]) corresponding to the access structure of the secret sharing scheme, and determines that the check data correspond to the secret reconstructed by said secret reconstruction means when $$e\_[j0]+s\_1*e\_[j1]+s\_2*e\_[j1]^2+\ldots+s\_N*e\_[j1]^N+r\_1*e\_[j1]^{[N+1]}+r\_2*e\_[j1]^{[N+2]}+\ldots+r\_[k-1]*e\_[j1]^{[N+k-1]}=c$$

where p is a prime, and k is a maximum number of shares necessary to reconstruct a secret is satisfied for a predetermined constant c and an arbitrary j=1, 2 ... m.

16. A verification apparatus which receives a secret s'=(s'_1, s'_2 ... s'_N) serving as a member among a number p^N of elements, a random number r'=(r'_1, r'_2 ... r'_[k−1]) serving as a member among a number p^[k−1] of elements, and check data (e_[i_10], e_[i_11]) generated by a share generation apparatus, determines that the secret s' has not been forged when e_[i0]+s'_1*e_[i1]+S'_2*e_[i1]^2+ ... +s'_N*e_[i1]^N+r'_1*e_[i1]^[N+1]+r'_2*e_[i1]^[N+2]+ ... +r'_[k−1]*e_[i1]^[N+k−1]=c where p is a prime, and k is a maximum number of shares necessary to reconstruct a secret is satisfied for a predetermined constant c, and when the verification apparatus determines that the secret s' has not been forged, outputs a signal representing that no forgery of the secret has been verified, and when the verification apparatus determines that the secret s' has been forged, outputs a signal representing cheating, wherein the share generation apparatus includes:

secret sharing means for sharing and encoding a secret in accordance with an access structure of a secret sharing scheme;

random number sharing means for sharing and encoding a random number in accordance with the access structure of the secret sharing scheme; and check data generation means for generating check data corresponding to the secret and the random number, and for a secret s=(s_1, s_2 ... s_N) serving as a member of a field having the number p^N of elements, a random number r=(r_1, r_2 ... r_[k−1]) serving as a member of a field having the number p^[k−1] of elements, and the predetermined constant c, said check data generation means selects at random n members (e_[10], e_[11]), (e_[20], e_[21]) ... (e_[n0], e_[n1]) of GF(p)^2 that satisfy $$e\_[i0]+s\_1*e\_[i1]+s\_2*e\_[i1]^2+\ldots+s\_N*e\_[i1]^N+r\_1*e\_[i1]^{[N+1]}+r\_2*e\_[i1]^{[N+2]}+\ldots+r\_[k-1]*e\_[i1]^{[N+k-1]}=c$$

where p is a prime, and k is a maximum number of shares necessary to reconstruct a secret.

17. A secret sharing system comprising a share generation apparatus, storage devices, and a reconstruction apparatus, said share generation apparatus including:

secret sharing means for sharing and encoding a secret in accordance with an access structure of a secret sharing scheme;

random number sharing means for sharing and encoding a random number in accordance with the access structure of the secret sharing scheme; and check data generation means for generating check data corresponding to the secret and the random number, said storage devices storing the shared/encoded secret, the shared/encoded random number, and the check data, and said reconstruction apparatus including:

secret reconstruction means for reading out the shared/encoded secret from said storage devices corresponding to the access structure, and reconstructing the secret in accordance with the access structure;

random number reconstruction means for reading out the shared/encoded random number from said storage devices corresponding to the access structure, and reconstructing the random number in accordance with the access structure; and cheating detection means for reading out the check data from all said storage devices corresponding to the access structure, when all the readout check data correspond to the secret reconstructed by said secret reconstruction means and the random number reconstructed by said random number reconstruction means, outputting the reconstructed secret, and when not all the readout check data correspond to the secret reconstructed by said secret reconstruction means and the random number reconstructed by said random number reconstruction means, outputting a signal representing cheating, wherein for a secret s=(s_1, s_2 ... s_N) serving as a member of a field having a number p^N of elements, a random number r=(r_1, r_2 ... r_[k−1]) serving as a member of a field having a number p^[k−1] of elements, and a predetermined constant c, said check data generation means selects at random n members (e_[10], e_[11]), (e_[20], e_[21]) ... (e_[n0], e_[n1]) of GF(p)^2 that satisfy $$e\_[i0]+s\_1*e\_[i1]+s\_2*e\_[i1]^2+\ldots+s\_N*e\_[i1]^N+r\_1*e\_[i1]^{[N+1]}+r\_2*e\_[i1]^{[N+2]}+\ldots+r\_[k-1]*e\_[i1]^{[N+k-1]}=c$$

where p is a prime, and k is a maximum number of shares necessary to reconstruct a secret, and said cheating detection means receives the secret s=(s_1, s_2 ... s_N) serving as a member of the field having the number p^N of elements, the random number r=(r_1, r_2 ... r_[k−1]) serving as a member of the field having the number p^[k−1] of elements, and check data (e_[i_10], e_[i_11]), (e_[i_20], e_[i_21]) ... (e_[i_m0], e_[i_m1]) corresponding to the access structure of the secret sharing scheme, and determines that the check data correspond to the secret reconstructed by said secret reconstruction means when $$e\_[j0]+s\_1*e\_[j1]+s\_2*e\_[j1]^2+\ldots+s\_N*e\_[j1]^N+r\_1*e\_[j1]^{[N+1]}+r\_2*e\_[j1]^{[N+2]}+\ldots+r\_[k-1]*e\_[j1]^{[N+k-1]}=c$$

where p is a prime, and k is a maximum number of shares necessary to reconstruct a secret is satisfied for the predetermined constant c and an arbitrary j=1, 2 . . . m.

18. A secret sharing system comprising a share generation apparatus, storage devices, a reconstruction apparatus, and a verification apparatus, said share generation apparatus including:

secret sharing means for sharing and encoding a secret in accordance with an access structure of a secret sharing scheme;

random number sharing means for sharing and encoding a random number in accordance with the access structure of the secret sharing scheme; and check data generation means for generating check data corresponding to the secret and the random number, said storage devices storing the shared/encoded secret, the shared/encoded random number, and the check data, and said reconstruction apparatus including:

secret reconstruction means for reading out the shared/encoded secret from said storage devices corresponding to the access structure, and reconstructing the secret in accordance with the access structure;

random number reconstruction means for reading out the shared/encoded random number from said storage devices corresponding to the access structure, and reconstructing the random number in accordance with the access structure; and cheating detection means for reading out the check data from all said storage devices corresponding to the access structure, when all the readout check data correspond to the secret reconstructed by said secret reconstruction means and the random number reconstructed by said random number reconstruction means, outputting the reconstructed secret and the reconstructed random number, and when not all the readout check data correspond to the secret reconstructed by said secret reconstruction means and the random number reconstructed by said random number reconstruction means, outputting a signal representing cheating, and wherein said verification apparatus acquires the secret reconstructed by said secret reconstruction means, the random number reconstructed by said random number reconstruction means, and the check data stored in said storage devices, when said verification apparatus determines that the secret has not been forged, outputs a signal representing that no forgery of the secret has been verified, and when said verification apparatus determines that the secret has been forged, outputs a signal representing cheating, for a secret s=(s_1, s_2 . . . s_N) serving as a member of a field having a number p^N of elements, a random number r=(r_1, r_2 . . . r_[k−1]) serving as a member of a field having a number p^[k−1] of elements, and a predetermined constant c, said check data generation means selects at random n members (e_[10], e_[11]), (e_[20], e_[21]) . . . (e_[n0], e_[n1]) of GF(p)^2 that satisfy $$e\_[i0]+s\_1*e\_[i1]+s\_2*e\_[i1]^2+\ldots+s\_N*e\_[i1]^N+r\_1*e\_[i1]^{[N+1]}+r\_2*e\_[i1]^{[N+2]}+\ldots+r\_[k-1]*e\_[i1]^{[N+k-1]}=c$$

where p is a prime, and k is a maximum number of shares necessary to reconstruct a secret, said cheating detection means receives the secret s=(s_1, s_2 . . . s_N) serving as a member of the field having the number p^N of elements, the random number r=(r_1, r_2 . . . r_[k−1]) serving as a member of the field having the number p^[k−1] of elements, and check data (e_[i_10], e_[i_11]), (e_[i_20], e_[i_21]) . . . (e_[i_m0], e_[i_m1]) corresponding to the access structure of the secret sharing scheme, and determines that the check data correspond to the secret reconstructed by said secret reconstruction means when $$e\_[j0]+s\_1*e\_[j1]+s\_2*e\_[j1]^2+\ldots+s\_N*e\_[j1]^N+r\_1*e\_[j1]^{[N+1]}+r\_2*e\_[j1]^{[N+2]}+\ldots+r\_[k-1]*e\_[j1]^{[N+k-1]}=c$$

where p is a prime, and k is a maximum number of shares necessary to reconstruct a secret is satisfied for the predetermined constant c and an arbitrary j=1, 2 . . . m, and said verification apparatus receives a secret s'=(s'_1, s'_2 . . . s'_N) serving as a member among the number p^N of elements, a random number r'=(r'_1, r'_2 . . . r'_[k−1]) serving as a member among the number p^[k−1] of elements, and the check data (e_[i_10], e_[i_11]), and determines that the secret s' has not been forged when $$e\_[i0]+s\_1*e\_[i1]+s\_2*e\_[i1]^2+\ldots+s\_N*e\_[i1]^N+r\_1*e\_[i1]^{[N+1]}+r\_2*e\_[i1]^{[N+2]}+\ldots+r\_[k-1]*e\_[i1]^{[N+k-1]}=c$$

where p is a prime, and k is a maximum number of shares necessary to reconstruct a secret is satisfied for the predetermined constant c.

* * * * *

UNITED STATES PATENT AND TRADEMARK OFFICE
CERTIFICATE OF CORRECTION

PATENT NO. : 8,483,386 B2  
APPLICATION NO. : 12/747400  
DATED : July 9, 2013  
INVENTOR(S) : Satoshi Obana Page 1 of 1

It is certified that error appears in the above-identified patent and that said Letters Patent is hereby corrected as shown below:

In the Claims

Column 13, Line 40: In Claim 1, after "central" insert -- processing --

Column 14, Line 6: In Claim 4, after "central" insert -- processing --

Column 15, Line 14: In Claim 7, after "central" insert -- processing --

Column 15, Line 42: In Claim 8, after "comprising" insert -- a --

Column 20, Line 65: In Claim 17, delete "$e\_[i\_{11}])$," and insert -- $e\_[i\_11])$, --

Signed and Sealed this  
Eleventh Day of November, 2014

Michelle K. Lee  
*Deputy Director of the United States Patent and Trademark Office*